United States Patent Office 3,417,327
Patented Dec. 17, 1968

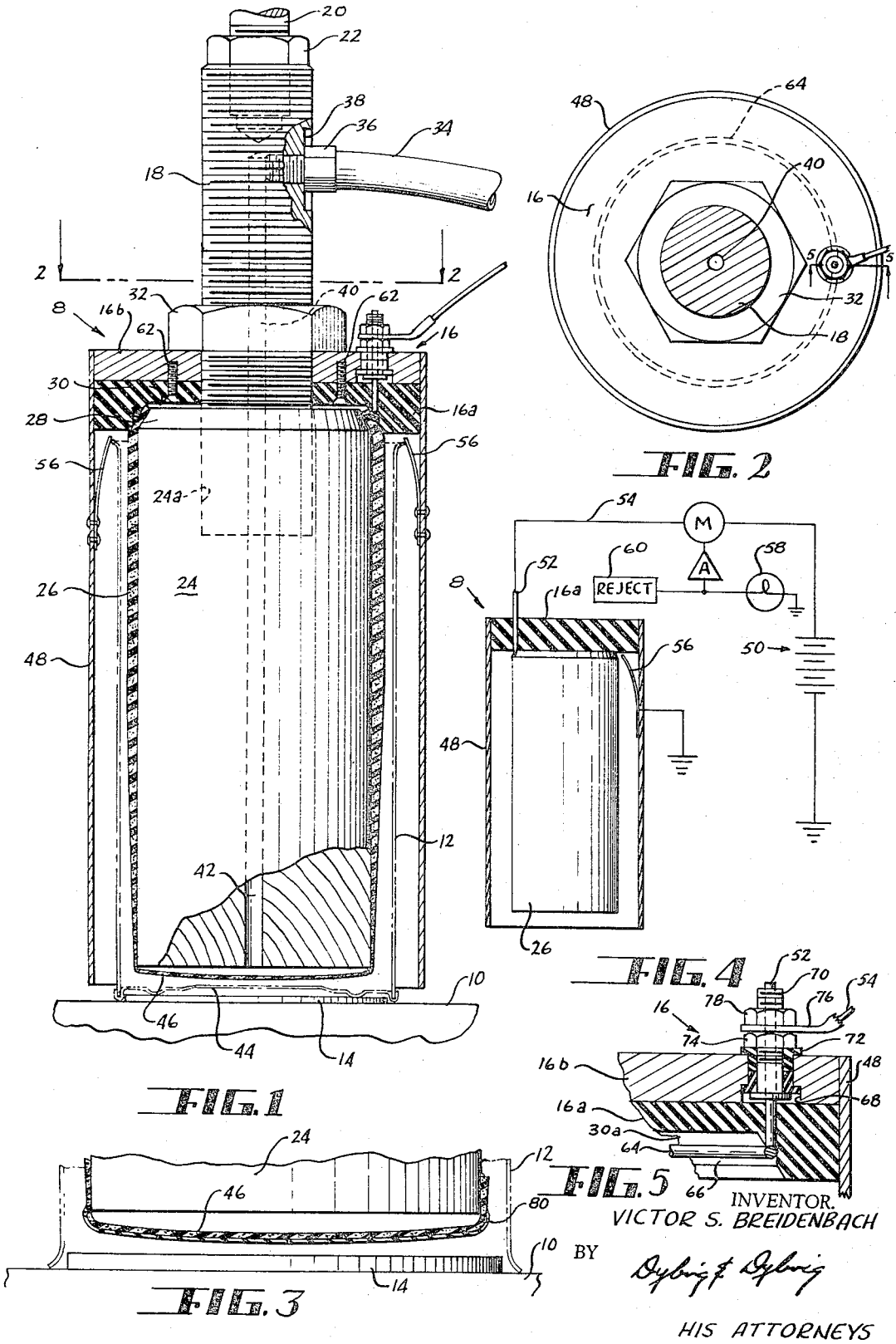

3,417,327
METHOD AND APPARATUS INCLUDING AN EXPANDABLE ELECTRICALLY CONDUCTIVE BOOT FOR TESTING INTERIOR COATINGS OF METAL CANS OR THE LIKE
Victor S. Breidenbach, Dayton, Ohio, assignor to Hyde Park Electronics, Dayton, Ohio, a corporation of Ohio
Filed Mar. 8, 1966, Ser. No. 532,808
14 Claims. (Cl. 324—54)

ABSTRACT OF THE DISCLOSURE

Electrically insulating coatings of metal cans are treated by applying an electrical potential across the coating between the metal can and a hollow cylindrical conductive rubber boot. The boot is mounted on a mandrel and expanded by air under pressure into intimate contact with the can coating. A grounded cylindrical sheath concentric with the boot surrounds the can under test and carries contacts engaging the can metal. The sheath is supported on a cap through which electrical connection is made to the boot.

---

This invention relates to a method and apparatus for testing coatings, and especially for detecting imperfections in protective coatings on the interior surfaces of cans.

The interior surfaces of cans used for packaging foods and beverages are usually coated with a protective material, such as lacquer, to prevent contact between the can metal and the packaged food or beverage. An imperfect coating, such as caused by faulty application thereof, or by scratches in the coating, some of which may be almost invisible, may cause deterioration in the packaged material. Accordingly, the cans produced must be tested for coating flaws. Presently, the tests used are conducted only on random samples. As a safety factor, plural applications of the coating material are commonly made during the can production.

An object of this invention is to provide a testing method and apparatus capable of testing the coating on all cans passing along a production line. A related object of this invention is to provide a sufficiently reliable testing method and apparatus therefor that one or more steps in the production of cans may be omitted.

One type of test presently in use involves the detection of electric current leakage between an electrode abutted against the coating and the can metal. The coating, because an electrical insulator, will exhibit a resistance to current flow thereacross which is quite high. Imperfections in the coating greatly reduce the resistance to current flow, usually by factors of ten or more. For best results, the electrode desirably engages over a large surface area of the coating since the effects of very small scratches or of undesirably thin coatings will be additive over the entire area being tested. Conductive liquids have, accordingly, been used as the electrode. Also, resilient electrode pads coated with a conductive liquid have been used in testing relatively flat surfaces, such as can ends. Because conductive liquids are usually destructive of the can lining, the tested cans or can ends must be discarded.

Modern high speed production techniques require a test procedure that is rapid and non-destructive of the cans and of the coatings. The test procedures should not involve the use of any material which would pollute or affect the odor of the packaged food or beverage and thus require the further step of cleaning the cans after the test. Accordingly, a more specific object of this invention is to provide an improved, reliable method and apparatus for an electrical test for detecting flaws in protective coatings which is non-destructive, leaves essentially no residue and may be sufficiently rapid to keep pace with high speed production equipment of the type used in the manufacture of cans.

Another object of this invention is to provide an improved electrode structure capable of contacting substantially the entire tubular interior surface areas of cans or the like.

The test procedure discussed herein may take place at any of several points in a can production line, either before or after one of the can ends is sealed to the tubular can body. To avoid a multiplicity of tests, another object of this invention is to provide an electrode structure capable of engaging the interior surface of a can end at the same time the interior tubular surface of the can is engaged.

It is contemplated that the method and apparatus described herein may be used as part of a quality control program, either in connection with other laboratory tests or in connection with the laboratory testing of a random sampling of can bodies or the like. Accordingly still another object of this invention is to provide an improved method and apparatus for making laboratory tests of protective coatings.

Other objects and advantages will become apparent from the following description.

Referring to the drawing:

FIGURE 1 is a longitudinal cross-sectional view with parts broken away of a portion of a testing device made in accordance with this invention.

FIGURE 2 is a transverse cross-sectional view of a portion of the device shown in FIGURE 1 as viewed in the direction of arrows 2—2 thereof.

FIGURE 3 is an enlarged cross-sectional view similar to a portion of FIGURE 1 but showing a modification thereof.

FIGURE 4 is a schematic illustration of an electrical testing circuit in accordance with this invention.

FIGURE 5 is an enlarged cross-sectional view of a portion of the testing device as viewed in the direction of arrows 5—5 of FIGURE 2.

Referring in greater detail to FIGURE 1, a generally cylindrical electrode assembly, generally designated 8, is shown above a portion of a support structure or base 10 upon which is supported a can 12. To appropriately locate the can 12 relative to the electrode assembly 8, the base 10 may be provided with a suitable depression or, as illustrated in FIGURE 1, the base 10 may be provided with an upwardly projecting locating plate or base pad 14 encircled by the bottom annular flange of the can 12. The electrode assembly 8 includes a cap member 16 mounted on an externally threaded connecting rod 18 extending axially through a central aperture therein, which rod 18 may in turn be connected, as by a support rod 20 and nut 22 to a suitable standard or the like (not shown). For reasons which will become apparent, at least the lower part designated 16a, of the cap member 16 is made of non-conductive material. Desirably, the lower cap part 16a should be made of a non-hygroscopic material such as Delrin.

Threaded onto the lower end of the connecting rod 18 is an electrode structure including a generally cylindrical mandrel 24 having a threaded, central recess 24a in its upper end receiving the rod 18, and an expandable boot 26 comprising a tubular body member having an open upper end. The interior tubular surface of the boot 26 is contiguous to or engaged with the exterior cylindrical surface of the mandrel 24. An integral, planar lower end wall 46 closes the lower end of the tubular body member of the boot 26. To securely hold the boot 26 in air tight sealing engagement with the upper end of the mandrel 24, the open upper end of the boot 26 is confined between a tapered upper surface portion 28 of the mandrel 24 and a confronting, tapered peripheral surface 30a (FIGURE 5) of a recess 30 in the lower surface of the cap part 16a. Threadedly received on the threaded rod 18 is a hex nut 32 which, when rotated relative to the rod 18, causes the mandrel 24 to move upwardly within the recess 30 whereupon the upper open end portion of the boot 26 is securely wedged between the confronting tapered surfaces 28 and 30a. Again for reasons which will become apparent, the mandrel 24 is made from wood or plastic or some other non-conductive mateiral. The boot 26 is electrically conductive and may be a molded conductive rubber material.

A test procedure in accordance with this invention begins with the placing of a can 12 relative to the electrode assembly 8 in the position illustrated in FIGURE 1. The boot 26 has a smaller diameter than the internal diameter of the can 12 and is designed to be placed within the can 12 along its longitudinal axis.

After the electrode structure comprising the mandrel 24 and the boot 26 are inserted into the position shown in FIGURE 1 relative to a can 12 to be tested, a test procedure in accordance with this invention continues with the introduction of compressed air into the boot 26 from a source of air under pressure (not shown) through an air line 34, a connecting fixture 36 abutted against a flat 38 formed on the connecting rod 18, a passageway 40 extending axially through the rod 18 from the point of connection of the air line 34 to the lowermost end of the connecting rod 18, and an air passageway 42 extending axially through the center of the mandrel 24. Thereupon, the boot 26 begins to expand outwardly from the mandrel 24 such that its outer surface contacts the interior coated surface of the can 12. Of course, the expansion of the boot 26 can be accomplished by fluids other than air.

The can 12 illustrated in FIGURE 1 already has its lower can end, designated 44, connected thereto. Because of the special construction of the boot 26 to be described below, the boot 26 will not initially expand equally in all directions, but will begin to expand from its lowermost end wall 46 first into engagement with the interior surface of the can end 44. Then the lower portion of the tubular sidewall of the boot 26 expands such that the initial contact between the boot 26 and the tubular sidewall of the can 12 will be at its lowermost end. In this way, air that might otherwise be trapped within the can 12 is completely exhausted therefrom as the boot 26 expands. An electrical test step is described below in which complete contact between the boot 26 and a can interior is desired. Trapping of air within the can 12 would cause the formation of air pockets between the inner surface coating of the can 12 and the otuer surface of the boot 26 and would, therefore, prevent complete contact therebetween.

It has been found that trapping of air can be avoided by constructing the boot 26 such that the lower end wall 46 is the thinnest portion of the boot 26 and such that its tubular body member tapers from a maximum thickness at approximately its midportion down to substantially the thickness of the end wall 46 at its lowermost margin. That is, the thickness of the tubular body member gradually increases from approximately that of the end wall 46 at its lowermost end to its maximum thickness at approximately its longitudinal midsection. The upper portion of the boot 26 may have a constant sidewall thickness except that, when assembled on the mandrel 24, the extreme uppermost portion of the boot 26 will be somewhat thinner because it is compressed between the tapered surface 28 of the mandrel 24 and the tapered surface 30a of the recess 30. In view of this construction, the controlled expansion of the boot 26 from its end wall 46 upwardly, as described above, is automatic. When fully expanded, there are very few or no air pockets between the boot 26 and the can 12. There will even be substantially complete, perhaps even complete, contact between the boot 26 and the lower corner of the can 12 between its body and its end 46. The air pressure is controlled such that the uppermost, exposed end of the boot 26 will overlap slightly onto the outturned upper flange of the can body, which flange is typically formed thereon.

Rubber made conductive as by the introduction of carbon particles in ordinary rubber formulations is well known. The specific mixture for a satisfactory conductive material used to form a boot 26 will depend upon the size of the cans to be tested, the air pressure to be used and the type of electrical test instruments employed. A boot 26 having a maximum sidewall thickness of approximately ⅛ inch and an endwall thickness of .040 inch has been successfully used in testing a 211 can. The flexibility of the rubber material used to form the boot was such that its end wall 46 hung loosely downwardly from the bottom surface of the mandrel 24 in the manner shown in FIGURE 1.

The electrode structure described above may be used as part of a laboratory instrument for testing one can at a time and is also intended for use in production lines wherein there may be several such electrode structures mounted on a common support (not shown) adapted to enter cans being conveyed adjacent to the electrode assemblies 8, either along planar or circular conveyor systems, both of which are known in the art. Whether in the laboratory or in a production line, the supply of compressed air to the boot 26 can be limited by conventional relief valve or pressure regulator means (not shown) located between the source and the air conduit means comprising the connecting rod 18 and the mandrel 24. The setting of the relief valve or pressure regulator means can be such that substantially complete contact is assured between the boot 26 and the entire inner surface of a can 12, whether coating or metal, yet the pressure exerted against the can 12 is insufficient to destort its dimensions. In a production line, a test procedure may occasionally be initiated when no can is moved into the proper location relative to the boot 26. Because a can to be tested otherwise serves to confine the boot 26, such a circumstance could lead to a possibly destructive "blow out" of the boot 26 beyond the area normally defined by the cans under test. Accordingly, as illustrated in FIGURE 1, a cylindrical sheath 48 may be mounted on the periphery of the cap member 16 in any suitable fashion and depend therefrom in surrounding relation to the boot 26. The sheath 48 may assist in appropriately locating the can 12 and, as will be discussed below, may be used to support part of the test circuitry. Its primary function, however, is to confine the boot 26 should a can improperly be positioned for the test procedure.

After the boot 26 is engaged with substantially the entire interior surface of the can 12, an electrical property of the interior coating is tested. FIGURE 4 schematically illustrates a simple but reliable test circuit that may be used. This circuit includes an electrical energy source such as the battery 50 illustrated therein connected at one end to ground and series connected at its other end to a meter M. A boot contact member 52 is connected in series with the meter M by a conductive wire 54. As schematically illustrated in FIGURE 4, the boot contact member 52 passes through at least the lower cap part 16a and engages the boot 26. The construction of one embodiment of the boot contact member 52 will be described below in connection with a more detailed description of the presently preferred embodiment of the cap 16.

A ground connected contact 56 fixed in relation to the cap member 16 is adapted to engage the uppermost outer extremity of the can 12 undergoing test since this portion may be the only portion of the can which is not coated with an insulating material. As illustrated in FIGURE 1, there may be several such ground connected contacts 56 electrically connected together. In the illustrated embodiment, the sheath 48 is made of a conductive material and serves as a support for the contact members 56.

Therefore, no additional electrical connection is required between the several ground contacts 56.

The meter M may be a simple ammeter or a vacuum tube voltmeter and may, as schematically illustrated, be connected to an amplifier A which in turn may control a signal device such as a signal lamp 58 and may drive reject pawls or the like schematically illustrated as a "REJECT" 60. The final step in the test, as schematically illustrated in FIGURE 4, merely involves the detection of the resistance, or current flow, across the expandable boot 26 and the can metal. Should the resistance of the coating be below a predetermined value, the coating will imperfectly cover the can metal and the reject mechanism is triggered to cast the tested can aside. Of course, immediately after one can is tested, the air is exhausted from the boot 26 and the boot 26 removed from the can in readiness for insertion into another can.

With reference to FIGURES 1 and 5, the cap member 16 is shown as comprising the lower cap part 16a made of a suitable insulating material as mentioned above and an upper cap part 16b having a lower surface co-extensive with the upper surface of the lower cap part 16a. As shown in FIGURE 2, the cap 16 is disc shaped. The upper part 16b of the cap 16 is made from metal in the preferred embodiment to provide a good threaded connection to the rod 18 and to provide a support for the sheath 48 which for this purpose may be welded or otherwise attached thereto. As illustrated in FIGURE 1, the cap parts 16a and 16b are rigidly connected as by flat head screws 62 located in aligned apertures therein.

To insure good contact between the boot contact member 52 and the top of the boot 26, the contact member 52 is provided with a ring-shaped lower end portion 64 received in an annular notch 66 in the tapered surface portion 30a of the recess 30. The lower end portion 64 may be integral with or soldered to the vertical part of the boot contact member 52 which projects through the cap part 16a so that the vertical portion of the contact member 52 projects above the cap 16. The cap part 16b is provided with a counterbored aperture 68 through which the vertical part of the contact member 52 passes. The specific connection between the member 52 and the conductive wire 54 illustrated includes a conductive collar 70 surrounding the vertical part of the boot contact member 52 projecting through the aperture 68 and separated from the metal cap part 16b by means of an insulating collar 72 encircling the conductive collar 70 and snugly received within the aperture 68. The insulating collar 72 is flanged at both ends to overlie the margins of the upper end and the counterbore of the aperture 68. As illustrated, the insulating collar 72 is desirably transversely split into two identical halves for ease in assembly. The lower end of the conductive collar 70 is also flanged to overlap the lower end of the bore of the insulating collar 72. The collars 70 and 72 are held in fixed relation by means of a nut 74 threaded onto exterior screw threads cut in the upper end of the collar 70. The wire 54 terminates in a conventional ring-shaped electrical connector 76 encircling the conductive collar 70 and sandwiched between the nut 74 and another nut 78 which also is threaded on the collar 70. Preferably, the upper end of the boot contact member 52 is welded to the upper end of the collar 70. Hence, when the nut 74 is first tightened, the lower end 64 of the boot contact member 52 will be snugly held within the notch 66. When the electrode assembly 8 is assembled, the lower end 64 of the boot contact member 52 will be firmly held in engagement with the entire periphery of the portion of the boot 26 compressed between the tapered surfaces 28 and 30a.

The test structure described above may be used for testing cans with one end already positioned as shown in FIGURE 1 or may, as shown in FIGURE 3, be used to test only the tubular can body. In FIGURE 3, like reference characters have been placed on like parts. Because it is desired to obtain contact only between the boot 26 and the tubular sidewalls of the can 12 in the test procedure illustrated in FIGURE 3, the lowermost end wall of the boot 26 shown in FIGURE 3 is covered by an insulating coating 80 which may comprise any suitable insulating material sprayed or otherwise adhered to the lower end wall 46. The coating 80 would not be necessary if the base pad 14 or part of the base 10 were made from a non-conductive material insulating the pad 14 from ground.

As will be appreciated, the testing procedures outlined above can be conducted quite rapidly. For use in production line tests, the electrode assembly 8 may be mounted for movement along a path parallel to the movement of the cans undergoing tests to avoid any delay in the can production. It is to be understood that the base 10 and the support rod 20 are relatively moved by any suitable means to appropriately locate the electrode structure comprising the mandrel 24 and the boot 26 in the can to be tested. It is also to be understood that entirely conventional pneumatic controls, and timing devices, can be used to control the expansion of the boot 26 and its position relative to the can 12 to be tested. Similarly, the energization of the electric circuit may be cyclically controlled. Since devices for accomplishing such functions are well known, none is desribed herein.

Because only the boot 26 and the contact or contacts 56 engage the can being tested, little or no impurities are introduced into the can. For the same reason, and because the maximum air pressure can easily be controlled, the tests are non-destructive of either the can or the coating. In production tests, a boot 26 may occasionally be damaged when a can 12 is misaligned on the base 10. In view of the simplified construction employed, the ease with which damaged boots 26 may be replaced will be readily apparent. It is thus seen that a highly reliable, rapid testing procedure has been provided by this invention, satisfying all of the objects set forth above. If the test procedure described above is incorporated in a production line, more than one coating operation, as is the current practice, may be unnecessary since all cans produced will be satisfactorily tested.

While the preferred embodiment of the inventive method and apparatus have been described above, it will be recognized that the invention may be practiced in various embodiments within the scope of the following claims. Terms of references, such as "upper," "lower" and so forth used in the appended claims are for convenience and it will be understood that such terms are intended merely to correlate portions of the apparatus. For example, the cans to be tested may be coursed around an overhead pathway or a circular pathway adjacent the test apparatus. In such circumstance, the base 10 and the can 12 thereon would not remain fixed beneath the electrode assembly 8.

I claim:

1. Apparatus for testing for imperfections in the interior, electrically insulating coating of a hollow, electrically conductive tubular object, such as a food can or the like, comprising: an expandable tubular electrically conductive boot open at its upper end and closed at its lower end by an end wall, means supporting said boot within the object to be tested, conduit means adapted to be connected to a source of fluid under pressure providing a fluid passageway into the open end of said boot; means establishing a seal between the open upper end of said boot and said conduit means whereby said boot is, upon the introduction of fluid therein, expanded into engagement with the interior surface of said object, and electric circuit means connected to said boot and to said electrically conductive object, said electric circuit means including means detecting the electrical resistance of said electrically insulating coating to indicate the extent of imperfections in the interior insulating coating of said object over the portion of said interior surface engaged by said boot.

2. The apparatus of claim 1 wherein said conduit means includes a generally cylindrical mandrel having a fluid passageway extending therethrough, and wherein said boot has an inner surface contiguous to at least a portion of the exterior cylindrical surface of said mandrel when said boot in not expanded.

3. The apparatus of claim 1 wherein said end wall is thinner and thus more flexible than the major portion of the tubular side wall of said boot, and wherein the lower portion of said boot tapers in thickness to a minimum thickness at its lowermost margin.

4. Apparatus for testing for imperfections in the interior, electrically insulating coating of a hollow, electrically conductive tubular object, such as a food can or the like, comprising: an expandable tubular electrically conductive boot comprising a tubular body member open at its upper end and closed at its lower end by an end wall, said end wall being thinner and thus more flexible than the major portion of said tubular body member and the lower portion of said body member tapering in thickness to a minimum thickness at its lowermost margin; means supporting said boot within the object to be tested; conduit means adapted to be connected to a source of fluid under pressure providing a fluid passageway into said boot, said conduit means including a generally cylindrical mandrel having a fluid passageway extending axially therethrough and an externally threaded rod extending upwardly from said mandrel, said rod having a fluid passageway communicating with the fluid passageway in said mandrel; a cap member having a central aperture therethrough through which said rod extends, said tubular body member having an inner surface contiguous to the exterior cylindrical surface of said mandrel when said boot is not expanded and the upper end of said boot being confined between said cap member and said mandrel whereby said boot is expanded upon the introduction of fluid therein; and electric circuit means connected to said boot and to said electrically conductive object, said electric circuit means including means detecting the electrical resistance of said electrically insulating coating to indicate the extent of imperfections in the interior insulating coating of said object over the portion of said interior surface engaged by said boot.

5. The apparatus of claim 4 further including a cylindrical sheath connected to the periphery of said cap member in surrounding relation to said boot, and said circuit means including at least one contact supported by said sheath adapted to engage an uncoated surface of the object to be tested.

6. The apparatus of claim 4 wherein said circuit means includes a boot contact member extending through said cap member and into engagement with said boot.

7. For use in testing electrical properties of coatings of cans and similar cylindrical or tubular objects, an electrode structure for engaging substantially the entire interior surface of the object to be tested comprising: a cap member having an opening therein; a mandrel having a fluid passageway therethrough communicating with the opening in said cap member; and a conductive, expandable tubular boot formed of a tubular body member partially surrounding said mandrel, said body member having a closed end wall remote from said cap member and an outer, generally cylindrical surface adapted to engage the interior surface of the object to be tested when said boot is expanded outwardly from said mandrel, and said body member having an open end opposite said closed end wall in fluid tight sealing relation to said mandrel, and said fluid passageway communicating with the interior of said boot whereby said boot is inflated upon the introduction of fluid under pressure therein through said passageway; and an electrical boot contact member engaging said boot.

8. The structure of claim 7 wherein said boot has an end wall closing one end of said tubular body member, said end wall being thinner and thus more flexible than the major portion of said tubular body member, and the portion of said tubular body member adjacent said end wall having a tapered thickness of gradually increasing dimension beginning at said end wall.

9. The structure of claim 7 wherein said open end of said boot is held in fluid tight sealing relation to said mandrel by said cap member.

10. The structure of claim 9 wherein said electric boot contact member extends through said cap member into engagement with said boot.

11. For use as an electrical contact in an electrode structure for an electrical test device, a one-piece, expandable, electrically conductive boot adapted to be connected to a source of fluid under pressure and made of flexible material such as rubber comprising a tubular body member open at one end, and an end wall integral with said body member closing the other end thereof, said other end of said boot including said end wall having the thinnest, and thus the most flexible, wall portion of said boot, whereby said boot will be controllably expanded when fluid under pressure is introduced therein, said thinnest wall portion undergoing the greatest initial expansion.

12. The boot of claim 11 wherein the sidewall of the portion of said tubular body member adjacent said end wall tapers in thickness to a minimum thickness of substantially the same thickness as said end wall at said other end.

13. The boot of claim 11 wherein said end wall is covered by an insulating material.

14. In a method of testing for imperfections in the interior, electrically insulating coating of electrically conductive metal cans, the steps of inserting an expandable, electrically conductive boot into a metal can to be tested, connecting an electric energy source is series with the can metal and said boot, expanding said boot into engagement with substantially the entire interior surface of said can be introducing a fluid under pressure into said boot, and detecting the electric current flow between the can metal and the surface of the expanded said boot engaged with the interior surface of said can.

References Cited

UNITED STATES PATENTS

| | | | |
|---|---|---|---|
| 2,313,379 | 3/1943 | Wood. | |
| 2,812,491 | 11/1957 | Figlio et al. | 324—54 |
| 2,900,597 | 8/1959 | Gooding | 324—54 |
| 2,978,637 | 4/1961 | Price et al. | 324—54 |
| 3,106,677 | 10/1963 | Edgar | 324—54 |
| 2,930,969 | 3/1960 | Baker | 324—10 |
| 3,069,620 | 12/1962 | Servos | 324—54 |
| 3,093,793 | 6/1963 | Hicken | 324—54 |

RUDOLPH V. ROLINEC, *Primary Examiner.*

G. R. STRECKER, *Assistant Examiner.*

U.S. Cl. X.R.

73—150; 118—9

UNITED STATES PATENT OFFICE
CERTIFICATE OF CORRECTION

Patent No. 3,417,327                                    December 17, 1968

Victor S. Breidenbach

It is certified that error appears in the above identified patent and that said Letters Patent are hereby corrected as shown below:

Column 6, line 44, "invention" should read -- inventions --. Column 8, line 44, "is series" should read -- in series --; line 47, "be" should read -- by --.

Signed and sealed this 9th day of June 1970.

(SEAL)
Attest:

Edward M. Fletcher, Jr.                    WILLIAM E. SCHUYLER, JR.
Attesting Officer                              Commissioner of Patents